United States Patent [19]

Kiang et al.

[11] Patent Number: 5,367,022
[45] Date of Patent: Nov. 22, 1994

[54] GRAFTED POLYMERIC PRODUCTS, AND ADHESIVE BLENDS

[75] Inventors: Webster W. Kiang, West Chester, Ohio; Edward M. Kajiwara, Park Ridge, Ill.; Diana C. Mattson, Loveland, Ohio

[73] Assignee: Quantum Chemical Corporation, Cincinnati, Ohio

[21] Appl. No.: 954,225

[22] Filed: Oct. 7, 1992

Related U.S. Application Data

[63] Continuation-in-part of Ser. No. 800,443, Nov. 27, 1991, abandoned.

[51] Int. Cl.$^5$ ............... C09J 123/16; C09J 151/06; C08F 255/04; B32B 15/08
[52] U.S. Cl. .................................. 525/74; 525/75; 525/78; 525/285; 525/289; 525/301; 525/193; 428/461; 428/476.1; 428/483; 428/516
[58] Field of Search ............... 525/285, 289, 301, 74, 525/78, 75, 193

[56] References Cited

U.S. PATENT DOCUMENTS

| | | | |
|---|---|---|---|
| 3,868,433 | 2/1975 | Bartz et al. | 260/876 R |
| 3,882,194 | 5/1975 | Krebaum et al. | 260/878 R |
| 4,078,017 | 3/1978 | Nagatoshi et al. | 525/285 |
| 4,087,587 | 5/1978 | Shida et al. | 428/500 |
| 4,087,588 | 5/1978 | Shida et al. | 428/500 |
| 4,198,327 | 4/1980 | Matsumoto et al. | 260/4 |
| 4,375,531 | 3/1983 | Ross | 525/93 |
| 4,506,056 | 3/1985 | Gaylord | 524/445 |
| 4,510,286 | 4/1985 | Liu . | |
| 4,550,130 | 10/1985 | Kishida et al. | 523/436 |
| 4,562,230 | 12/1985 | Fukui et al. . | |
| 4,727,120 | 2/1988 | Nogues | 525/285 |
| 4,764,546 | 8/1988 | Mitsuno et al. . | |
| 4,774,144 | 9/1988 | Jachec et al. | 428/461 |
| 4,842,947 | 6/1989 | Jachec et al. | 428/461 |
| 4,942,096 | 7/1990 | Abe et al. . | |
| 4,990,554 | 2/1991 | Nomura et al. . | |
| 4,996,944 | 3/1991 | Kiang . | |
| 5,001,197 | 3/1991 | Hendewerk | 525/285 |
| 5,032,459 | 7/1991 | Toyoshima et al. | 525/285 |
| 5,055,526 | 10/1991 | Sato et al. | 525/74 |
| 5,066,542 | 11/1991 | Tabor et al. | 428/461 |
| 5,079,052 | 1/1992 | Heyes et al. | 428/35.3 |
| 5,137,975 | 8/1992 | Kelusky | 525/263 |
| 5,202,192 | 4/1993 | Hope et al. . | |

FOREIGN PATENT DOCUMENTS 52-123473 10/1977 Japan .
1-13735 3/1989 Japan .

Primary Examiner—Vasu S. Jagannathan
Attorney, Agent, or Firm—Gerald A. Baracka; William A. Heidrich

[57] ABSTRACT

Highly functional grafted polymeric products of a predominantly propylene polymeric composition containing a thermoplastic ethylene-propylene copolymer and a carboxylic acid or derivative grafting monomer and having a desirably low melt flow rate, adhesive blends containing such grafted polymeric products, and composite structures incorporating the adhesive blends are provided. The grafted polymeric product may be prepared by melt grafting in the presence of a free radical generating catalyst and the substantial absence of solvent under shear and at a temperature selected to minimize or avoid premature decomposition of the catalyst and vaporization losses of the catalyst and monomer.

36 Claims, 1 Drawing Sheet

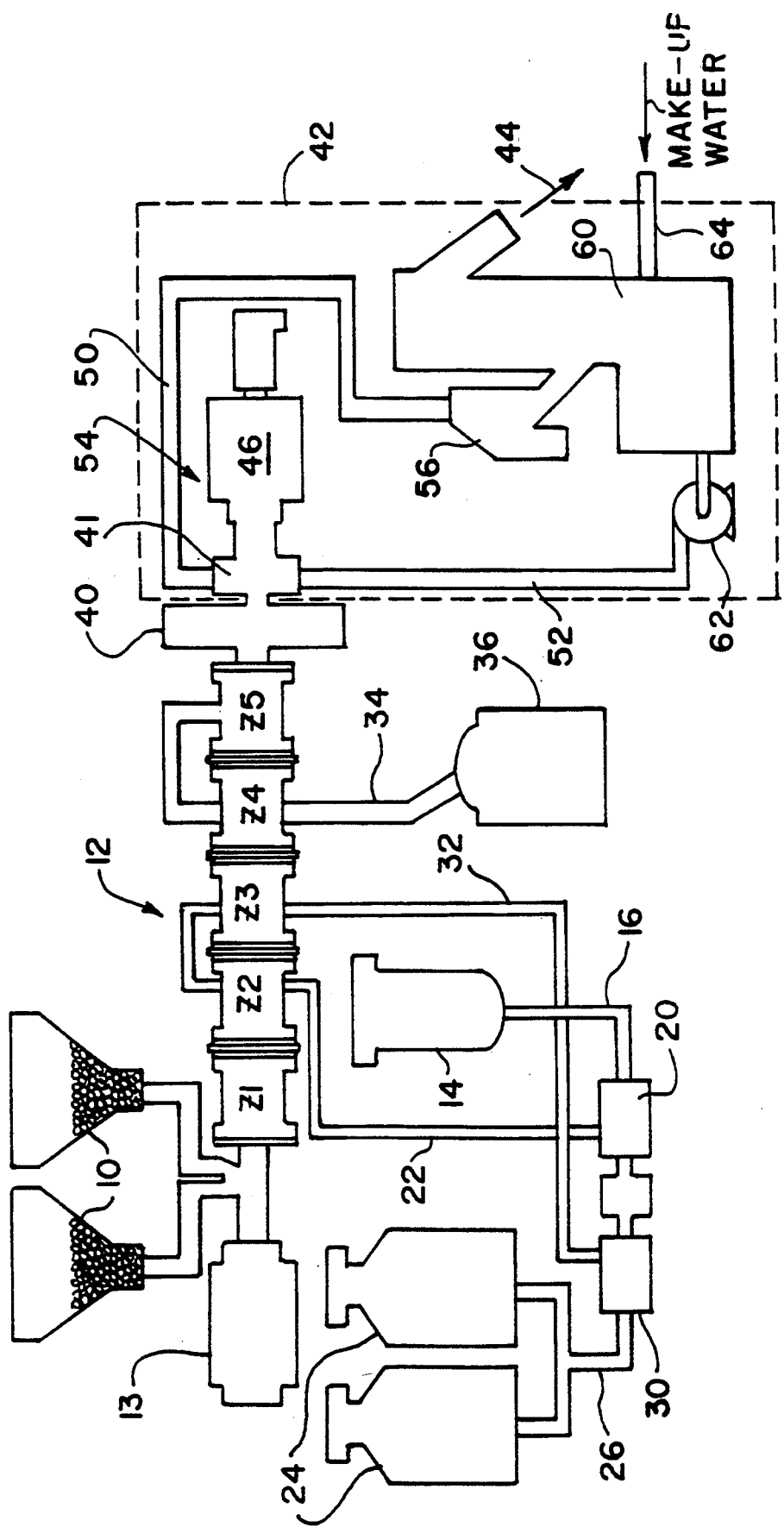

GRAFTED POLYMERIC PRODUCTS, AND ADHESIVE BLENDS

CROSS-REFERENCE TO RELATED APPLICATION

This is a continuation-in-part of copending, commonly assigned application Ser. No. 07/800,443 filed Nov. 27, 1991, now abandoned the entire disclosure of which is incorporated herein.

BACKGROUND OF THE INVENTION

1. Field of the Invention

This invention relates generally to grafted polymeric products, adhesive blends containing such products, and composite structures made therefrom and, more particularly, the invention relates to graft reaction products of propylene polymers and carboxylic acids and derivatives thereof, adhesive blends containing such grafted polymeric products, and composite structures incorporating such adhesive blends.

2. Description of Related Technology

Grafted polymeric products (e.g. graft copolymers) having polyolefin backbones grafted with polymerizable, ethylenically unsaturated carboxylic acids or acid derivatives, and the use of such products in adhesive blends, are well known. Various polyolefin backbones, such as ethylene homopolymers and copolymers and various forms of polypropylene have been utilized in the past.

Polypropylene-based graft copolymers are particularly useful in adhesive blends used for adhesion to one or more polypropylene substrates. Typically in the past such adhesive blends included a graft copolymer such as one having a polypropylene homopolymer backbone grafted with an acid anhydride such as maleic anhydride blended with a propylene homopolymer or an ethylene/propylene copolymer and, optionally, a third component such a linear low density polyethylene (LLDPE), a hydrocarbon rubber such as ethylene-propylene-diene monomer (EPDM) rubber or ethylene-propylene rubber (EPR), a poly(1-olefin) such as poly(butene-1), or an ethylene polymer such as high molecular weight low density polyethylene (HMW LDPE).

Prior polypropylene-based graft copolymers have been limited in terms of their maximum attainable functionality (i.e. concentration of grafted acid or derivative) and/or exhibited unacceptably low viscosity (as measured by high melt flow rates).

High acid or acid derivative functionalities are desirable in order to obtain desirable levels of adhesion at desirably low graft copolymer concentrations. Due to the inherently difficult process of grafting an acid or derivative to a polypropylene backbone, prior attempts to graft polypropylene, whether by the high temperature "thermal grafting" technique or by solution grafting methods resulted in maximum grafted acid or derivative concentrations of no more than about 1 to about 1.2 wt. %. Grafting in the presence of a peroxide or other free radical generating catalyst invariably resulted in chain scission and the resulting production of relatively low molecular weight grafted and ungrafted backbone fragments that must be removed from the grafting reaction product, as by solvent extraction, resulting in the loss of grafting monomer from the system.

For example, prior attempts to graft polypropylene homopolymer with maleic anhydride at a target grafted anhydride concentration of 2.0 wt. % typically resulted in about 1.5 to about 2.2 wt. % grafted monomer in the reaction product leaving the grafting reactor. After refining by solvent extraction to remove low molecular weight polymer fragments, the product would contain about 0.6 to about 1.2 wt. % grafted monomer.

Furthermore, prior attempts to graft polypropylene backbones with acid or derivative monomers resulted in unacceptably large increases in the melt flow rate of the product as compared to that of the ungrafted polypropylene, principally due to chain scission. For example, polypropylene homopolymer backbones having an initial melt flow rate (MFR) of about 2 to about 5 g/10 min. before grafting typically exhibited MFR values on the order of about 1500 g/10 min. after grafting with 1 wt. % maleic anhydride. Such melt flow rates are far too high for economical pelletizing operations such as the preferred underwater pelletizing method.

Thus, in the past, it was not possible to prepare highly functional polypropylene graft copolymers having desirably low melt flow rates. It is desirable to eliminate costly refining steps such as solvent extraction and to provide a graft polymeric product having a sufficiently low melt flow rate to facilitate pelletizing operations.

SUMMARY OF THE INVENTION

It is an object of the invention to overcome one or more of the problems described above.

According to the invention, a grafted polymeric product characterized by a high grafting monomer functionality and a relatively low melt flow rate is provided.

More particularly, the grafted polymeric product of the invention comprises a polymeric composition containing a thermoplastic ethylene-propylene copolymer and comprising predominantly propylene units, and at least about 1 wt. % of an ethylenically unsaturated carboxylic acid or derivative grafting monomer grafted thereto. The grafted polymeric composition is further characterized as having an MFR of about 700 g/10 min. or less.

The ungrafted polymeric composition is preferably a statistical (e.g. random) ethylene-propylene copolymer comprising about 1 to about 10 wt. % ethylene or an impact ethylene-propylene copolymer comprising about 5 to about 30 wt. % ethylene. The ungrafted polymeric composition preferably has an MFR of about 12 g/10 min. or less.

The inventive grafted polymeric product may be prepared by melt grafting under shear in the absence of solvent and in the presence of a free radical generating catalyst.

The invention also comprehends adhesive blends comprising the inventive grafted product and a blending resin comprising one or more ungrafted polyolefins, as well as composite structures incorporating the adhesive blends.

Other objects and advantages of the invention will be apparent to those skilled in the art from a review of the following detailed description, including the FIGURE, and the appended claims.

BRIEF DESCRIPTION OF THE FIGURE

The sole FIGURE is a schematic process flow diagram depicting a process and system for preparing a grafted polymeric product of the invention.

DETAILED DESCRIPTION OF THE INVENTION

The Grafted Polymeric Product

The invention provides a grafted polymeric product comprising a polymeric composition containing a thermoplastic ethylene-propylene copolymer, and a grafted ethylenically unsaturated carboxylic acid or derivative grafting monomer wherein the grafting monomer comprises at least about 1 wt. % of the grafted polymeric product, and wherein the grafted product has a melt flow rate (MFR) greater than that of the ungrafted polymeric composition and about 700 g/10 min. or less, and preferably about 500 g/10 min. or less, as measured according to ASTMD-1238, Condition L (230° C., 2160 g, 0.0825 in. capillary).

Ungrafted Polymeric Composition

The ungrafted polymeric composition, which contains a thermoplastic ethylene-propylene copolymer, comprises predominantly (i.e. greater than 50 wt. %, typically at least about 75 wt. %) propylene units, is preferably selected from statistical ethylene-propylene copolymers and "impact" ethylene-propylene copolymers, and typically has an initial (i.e., ungrafted) MFR of about 12 g/10 min. or less, preferably in the range of about 0.01 to about 12 g/10 min., and highly preferably at least about 0.1 g/10 min.

Statistical ethylene-propylene copolymers preferred for use as the ungrafted polymeric composition in the invention comprise about 1 to about 10 wt. %, highly preferably about 1 to about 6 wt. %, and most preferably about 2 wt. % ethylene and the balance propylene units. When grafted with about 1 to about 6 wt. %, preferably about 1.5 to about 4 wt. %, and highly preferably up to about 3 wt. % of the grafting monomer using a statistical copolymer having an ungrafted MFR of about 1 to about 3 g/10 min., the MFR of the resulting grafted product is about 700 g/10 min. or less, typically in the range of about 300 to 500 g/10 min., and preferably does not exceed about 600 times, and highly preferably does not exceed about 400 times the MFR of the ungrafted polymeric composition.

Impact copolymers are generally defined as (a) reactor-made intimate mixtures of propylene homopolymers and statistically (e.g. randomly) oriented copolymers of propylene and ethylene, or (b) blends of propylene homopolymers and statistically oriented copolymers of propylene and ethylene.

Impact copolymers are generally characterized as having Gardner Impact values of at least about 125 in-lbs., as measured at $-18°$ C. according to ASTMD-3029-84, test method "G."

Preferred impact ethylene-propylene copolymers useful in the invention as ungrafted polymeric compositions are reactor-made intimate mixtures of propylene homopolymers and statistically-oriented copolymers of propylene and ethylene and comprise about 5 to about 30 wt. %, highly preferably about 6 to about 16 wt. % ethylene. Such mixtures are typically made by a multi-stage polymerization process wherein, in a first, stirred reaction vessel, gaseous propylene is contacted with a polymerization catalyst, preferably of the titanium-ester coordination complex type, and an aluminum alkyl to produce propylene homopolymer. In a second stage, propylene and ethylene are copolymerized in intimate admixture with the polymer formed in the first stage.

Most preferably, the ungrafted impact copolymer comprises about 11 to about 15 wt. % (e.g. about 11.5 to about 12.7 wt. %) ethylene and has an ungrafted MFR in the range of about 0.4 to about 1.5 g/10 min. (e.g. about 0.8 to about 1.3 g/10 min.).

Impact copolymers having ethylene contents greater than 11 or 12 wt. % are sometimes referred to in the art as "thermoplastic olefins" ("TPOs") or "thermoplastic olefinic elastomers" ("TPOEs"), and are useful in the invention not only as polymeric compositions to be grafted, but as polyolefin blending resins in adhesive blends.

TPOs and TPOEs are sometimes additionally characterized by reference to their flex modulus and possibly other physical properties, but the correlation between ethylene content and these physical properties may vary with the specific technology used to produce these materials.

When an impact copolymer having an initial MFR of about 0.4 to about 1.5 g/10 min. is grafted with about 1 to about 6 wt. % (e.g. about 1.5 to about 4 wt. %) grafting monomer according to the invention, the MFR of the resulting grafted product is about 700 g/10 min. or less, typically in the range of about 200 to about 450 g/10 min., and the grafted product MFR preferably does not exceed about 600 times, and highly preferably does not exceed about 400 times the MFR of the ungrafted impact copolymer.

The ethylene-propylene copolymer-containing polymeric composition to be grafted comprises predominantly (i.e. greater than 50 wt. %) propylene units. However, especially in the case of impact copolymers, substantial amounts of substantially ungraftable or difficultly graftable components (such as propylene homopolymer, which grafts only at insignificant levels without chain scission) may be present, and the readily graftable ethylene-propylene copolymer component may be present in a disperse phase, for example dispersed in a continuous phase of propylene homopolymer. In any case, while the polymeric composition to be grafted is predominantly propylene, taken as a whole, the disperse ethylene-propylene copolymer phase need not be predominantly propylene, and may in fact be predominantly ethylene, as it may contain ethylene homopolymer, EPR, and block ethylene-propylene copolymer in addition to statistical ethylene-propylene copolymer and propylene homopolymer. Substantially all grafting occurs in the ethylene-containing disperse phase.

While the polymeric composition on which grafting takes place is predominantly propylene, the ethylene-containing polymer molecules on which grafting occurs need not be predominantly propylene, nor need the ethylene-containing disperse phase be predominantly propylene.

Grafting Monomer

The grafting monomer is at least one polymerizable, ethylenically unsaturated carboxylic acid or acid derivative, such as an acid anhydride, ester, salt, amide, imide, or the like. Such monomers include but are not necessary limited to the following: acrylic acid, methacrylic acid, maleic acid, fumaric acid, itaconic acid, citraconic acid, mesaconic acid, maleic anhydride, 4-methyl cyclohex-4-ene-1,2-dicarboxylic acid anhydride, bicyclo(2.2.2)oct-5-ene-2,3-dicarboxylic acid anhydride, 1,2,3,4,5,8,9,10-octahydronaphthalene-2,3-dicarboxylic acid anhydride, 2-oxa-1,3-diketospiro(4.4)non-7-ene, bicyclo(2.2.1)hept-5-ene-2,3-dicarboxylic acid anhydride, maleopimaric acid, tetrahydrophthhalic anhydride, norborn-5-ene-2,3-dicarboxylic acid anhydride, Nadic anhydride, methyl Nadic anhydride, Himic anhydride, methyl Himic anhydride, and x-methylbicyclo(2.2.1)hept-5-ene-2,3-dicarboxylic acid anhydride (XMNA).

Maleic anhydride is a preferred grafting monomer.

Level of Grafted Monomer Functionality

As used herein, the term "grafting" denotes covalent bonding of the grafting monomer to a polymer chain of the polymeric composition.

In an inventive grafted product of a statistical ethylene-propylene copolymer-containing polymeric composition and a maleic anhydride grafting monomer, the grafted maleic anhydride concentration is generally in the range of about 1 to about 6 wt. %, preferably at least about 1.5 wt. %, and highly preferably about 2 wt. %, and preferably is such that the MFR of the grafted product is about 700 g/10 min. or less, more preferably in the range of about 300 to about 500 g/10 min. Highly preferably, the statistical copolymer comprises about 2 wt. % ethylene and has an ungrafted MFR of about 2 g/10 min. Petrothene® PP-7200-MF polypropylene from Quantum Chemical Corporation is a suitable statistical ethylene-propylene copolymer for use as the ungrafted polymeric composition.

Where the ungrafted composition is an impact copolymer, it preferably has an ethylene content of about 12 to about 15 wt. % and an ungrafted MFR in the range of about 0.8 to about 1.5 g/10 min., and the preferred maleic anhydride grafting monomer is incorporated in the grafted product at a concentration such that the MFR of the grafted product is in the range of about 200 to about 400 g/10 min. The grafted maleic anhydride concentration is preferably about 1.5 wt. % to about 4 wt. %, and highly preferably about 2 wt. % to about 2.5 wt. %.

Process of Preparing Grafted Polymeric Products

The inventive grafted products may be conveniently prepared by melt blending the ungrafted polymeric composition, in the substantial absence of a solvent, with a free radical generating catalyst, such as a peroxide catalyst, in the presence of the grafting monomer in a shear-imparting reactor, such as an extruder reactor. Twin screw extruder reactors such as those marketed by Werner-Pfleiderer under the designations ZSK-53 and ZSK-83 are especially preferred.

Preferably, catalyst is introduced to the molten polymeric composition at ambient temperature and the grafting monomer is introduced to the resulting mixture. The grafting monomer may be introduced at a slightly elevated temperature (e.g. 50° C.). The grafting reaction is carried at a temperature selected to minimize or avoid rapid vaporization and consequent losses of the catalyst and monomer. The monomer is typically introduced to the reactor at a rate of about 0.01 to about 10 wt. % of the total of the polymeric composition and monomer, and preferably at about 1 to about 5 wt. % based on the total reaction mixture weight.

A temperature profile where the temperature of the polymer melt increases gradually through the length of the reactor up to a maximum in the grafting reaction zone of the reactor, and then decreases toward the reactor output is preferred. Temperature attenuation is desirable for product pelletizing purposes. An outlet molten polymer temperature of about 200±10° C. is optimum for operating an underwelter pelletizer for a ZSK-53 extruder.

In the case of the preferred di-tert-butyl peroxide (DTBP) catalyst, the maximum temperature should be maintained at or below about 220° C. (about 428° F.) to prevent vaporization losses or premature decomposition of the catalyst. In contrast, so-called "thermal" grafting processes of the prior art which do not use catalysts may use temperatures up to about 380° C. (about 716° F.). The maximum useful temperature in the invention varies with the selection of catalyst.

Since substantial amounts of solvent are to be avoided, the catalyst and monomer are preferably added in neat form to the reactor.

Specific examples of useful catalysts include:
1,1-bis(tert-butylperoxy)cyclohexane,
n-butyl-4,4-bis(tert-butylperoxyvalerate),
1,1-bis(tert-butylperoxy)-3,3,5-trimethylcyclohexane,
2,2-bis(tert-butylperoxy)butane,
dicumylperoxide,
tert-butylcumylperoxide,
a,a'-bis(tert-butylperoxyisopropyl)benzene,
di-tert-butylperoxide (DTBP),
2,5-dimethyl-2,5-di(tert-butylperoxy) hexane,
and the like.

A preferred process for preparing the grafted polymeric product of the invention is illustrated by the process flow diagram of the figure.

Referring to the FIGURE, an ungrafted polymeric composition in bulk, pelletized, or granular form is fed from feed bins 10, illustratively at a rate of about 50 lb/hr, into a first zone Z1 of a preheated twin-screw extruder/reactor, generally designated 12, driven by a motor 13, where the feed is heated gradually through a series of five heated zones designated Z1–Z5 to a molten state, while a free radical generating catalyst (e.g., di-tert-butyl peroxide) is separately fed, illustratively at a rate of about 0.5 lb/hr, from a feed tank 14 via a line 16 through a feed pump 20 and a line 22 into the zone Z2 of the extruder/reactor 12 to mix with the molten polymer. Separately, the grafting monomer, illustratively maleic anhydride, is fed, illustratively at a rate of about 2 lb/hr, from supply tanks 24 via a line 26 through a feed pump 30 and a line 32 to the zone Z2 of the extruder/reactor 12. The monomer and catalyst are fed separately to the same reaction zone.

The zones Z1–Z5 of the extruder 12 are maintained at temperatures ranging from about 165° C. to about 220° C. to effect melting of the polymeric composition and to control the rate of catalyst decomposition during the grafting reaction. The residence time of the reaction mixture in zones Z1–Z5 is generally about 3 to about 5 minutes, after steady-state conditions are established.

As the reaction proceeds in the reaction zones Z3 and Z4, any unreacted catalyst and monomer vapors are removed from the zone Z5 through a vent line 34. The collected vapors are condensed and trapped in a chilled vacuum tank 36.

The reactor 12 discharges molten grafted product through an optional Beringer screen changer 40 through a die plate 41 of an underwater pelletizer, generally designated 42, from which pelletized product is discharged at 44. In addition to the die plate 41, the pelletizer 42 comprises an internal knife blade (not shown) facing the die plate 41 and driven by a motor 46, water circulation conduits 50 and 52 communicating with a die plate/motor housing 54, a solid/liquid separator 56, and a spin dryer 60, as shown in the figure. A pump 62 is disposed between the conduit 52 and the dryer 60 to circulate water through the conduit 52, over the die plate 41, through the conduit 50 and the separator 56 to return to the pump 62. Make-up water is provided to the system through an inlet conduit 64, as needed.

Extruded grafted polymeric product from the die plate 41 is chopped by the knife blade, and a mixture of the resulting product pellets and water is carried by the conduit 50 to the separator 56, which separates the bulk of the water from the mixture, for recirculation to the die plate 41 through the conduit 52 by means of the pump 62. Product polymer is further separated from residual water in the dryer 60 and discharged at 44.

Adhesive Blends

Adhesive blends containing the grafted polymeric product of the invention and a blending resin comprising one or more ungrafted polyolefins are generally characterized as containing about 0.1 to about 25 wt. % of the grafted product and up to about 99.9 wt. % of the ungrafted polyolefin blending resin for a total of 100 wt. %. If desired, the blending resin can comprise up to about 40 wt. % (based on total blend) of an elastomeric polyolefin such as ethylene/propylene rubber (EPR) or ethylene-propylene-diene monomer (EPDM) rubber.

The concentration of grafted monomer in the adhesive blend is preferably in the range of about 0.001 wt. % to about 1 wt. %.

Thus, the adhesive blend may be characterized as comprising about 0.1 wt. % to about 25 wt. % of the inventive grafted polymeric product, about 35 to about 99.9 wt. % of an ungrafted polyolefin and 0 to about 40 wt. % of an elastomeric polyolefin, for a total of 100 wt. %.

The polyolefin blending resin may be an ungrafted propylene polymer, preferably selected from propylene homopolymers, statistical copolymers of propylene and up to about 30 wt. % of ethylene or a $C_4$-$C_6$ 1-olefin comohomer, or impact or "modified impact" (sometimes referred to in the art as "super impact") propylene-ethylene copolymers.

Impact copolymers useful as blending resins in the adhesive blends of the invention include those described above as useful in the ungrafted polymeric composition, including so-called TPOs or TPOEs.

Modified impact copolymers useful as blending resins in the adhesive blends of the invention comprise blends of an impact copolymer and an ethylene polymer, and preferably comprise a blend of between about 95 wt. % and about 70 wt. % of (A) an impact copolymer selected from the group consisting of (a) reactor-made intimate mixtures of polypropylene and statistically oriented copolymers of propylene and ethylene, and (b) blends of polypropylene and statistically oriented copolymers of propylene and ethylene, and between about 5 wt. % and about 30 wt. % of (B) an ethylene polymer. The ethylene polymer is preferably selected from the group consisting of ethylene homopolymers, low density polyethylene (LDPE), ethylene-acid copolymers (e.g. ethylene-acrylic acid copolymer), ethylene-vinyl acetate copolymers, ethylene-acrylate copolymers such as ethylene-ethyl acrylate copolymer, high density polyethylene (HDPE), linear low density polyethylene (LLDPE), so-called very low density polyethylene (VLDPE), so-called ultra low density polyethylene (ULDPE), and blends thereof.

Generally, LLDPE is defined for the purposes of this disclosure as having a density of up to about 0.940 g/cc, typically in the range of 0.910–0.939 g/cc, VLDPE is defined as having a density in the range of 0.9000–0.910 g/cc, and ULDPE is defined as having a density of 0.880–0.899 g/cc.

Modified impact copolymer blends typically comprise about 15 to about 30 wt. % total ethylene. Petrothene® PP-8755-HK resin from Quantum Chemical Corporation is a preferred modified impact copolymer having a total ethylene content of about 15 to about 30 wt. %.

The modified impact copolymer preferably has a melt flow rate (MFR, at 230° C.) of about 1 to about 200 g/10 min as measured by ASTM D-1238, Condition L, at 230° C., 2160 g, and a 0.0825 in. capillary. A preferred MFR of the modified impact copolymer is about 1 to about 50 g/10 min. and an MFR of about 1 to about 10 g/10 min. is particularly preferred. For blown film, blow molding, and rigid sheet forming applications, such as adhesive blends for bonding polypropylene to ethylene vinyl alcohol (EVOH) copolymer or polypropylene and nylon, the preferred MFR of the modified impact copolymer is about 1 to about 5 g/10 min. For cast film and extrusion coating applications that may also include adhesive blends for bonding polypropylene to EVOH copolymer or for bonding polypropylene to aluminum foil, the preferred MFR of the modified impact copolymer is about 5 to about 16 g/10 min.

In order to obtain a modified impact copolymer having an MFR in the preferred range stated in the immediately preceding paragraph, the blend of components (A) and (B) may be visbroken after blending, if needed. Visbroken modified impact polymeric blends and means for preparing the same are described in detail in Ross U.S. Pat. No. 4,375,531 (Mar. 1, 1983), the disclosure of which is incorporated herein by reference.

A preferred modified impact copolymer useful in the adhesive blend of the invention has a total ethylene content of about 16 to about 26 wt. % and is made by blending a mixture of about 5 to about 15 wt. % HDPE and about 95 to about 85 wt. % of a reactor-made impact copolymer containing about 6 to about 16 wt. % ethylene. A particularly preferred HDPE for use in this modified impact copolymer has a melt index (MI, as measured by ASTMD-1238, Condition E, i.e. at 190° C., 2160 g, and a 0.0825 in. capillary) of about 2 to about 50 g/10 min., and highly preferably about 30 g/10 min.

A preferred inventive adhesive blend comprises about 6 to about 16 wt. % of the grafted product and correspondingly about 94 to about 84 wt. % of an ungrafted impact or modified impact copolymer, for a total of 100 wt. %. A preferred grafted product concentration range when using a modified impact copolymer blending resin is about 4 wt. % to about 10 wt. %. In a highly preferred embodiment the blending resin comprises a modified impact copolymer having a melt flow rate of about 5 g/10 min. at a concentration of about 90 to about 96 wt. %, preferably about 93 wt. % to about 94 wt. %, and the balance a grafted product of the invention.

If desired, the blending resin may contain an ethylene polymer selected from ethylene homopolymers and copolymers of ethylene and a $C_3+$ (e.g., $C_3$-$C_8$) 1-olefin copolymer, preferably HMW LDPE or LLDPE.

HMW LDPE (high molecular weight low density polyethylene) is preferably an ethylene homopolymer having a specific gravity in the range of about 0.915 to about 0.930, inclusive, a melt index of less than about 1 dg/min. as measured at 190° C. (ASTM D-1238, Condition E), and a narrow molecular weight distribution as measured by a ratio of weight average molecular weight ($M_w$) to number average molecular weight ($M_n$) of about 3 to about 5, inclusive.

LLDPE is typically characterized as having a specific gravity of up to about 0.940, usually in the range of about 0.910 to about 0.939, although lower density materials may be used.

In another form, the inventive adhesive blend comprises about 6 to about 16 wt. % of the grafted polymeric product, 0 to about 30 wt. % (e.g., 18 wt. %) of an ethylene homopolymer or ethylene/1-olefin copolymer, and the balance an impact or modified impact copolymer.

The adhesive blend is preferably prepared by melt compounding the components with the usual additives (e.g. antioxidants, etc.) and pelletizing the blended material.

Composite Structures

The adhesive blends of the invention are useful in bonding to propylene polymers, polyesters, gas barrier materials and other polar substrates such as metals, nylon, ethylene vinyl alcohol copolymers, and the like.

As used herein with respect to blend components and composite structure substrates, the terms "polypropylene" and "propylene polymer" may be used interchangeably, and denote propylene homopolymers and copolymers, whether statistical (e.g. random), block, impact or modified impact copolymers, unless otherwise indicated.

The adhesive blends are especially suitable for bonding polypropylene substrates to EVOH and other polar substrates. Such EVOH substrates are generally formed front 29 to 48 mole % ethylene grades.

Five- and six-layer structures are suitable for use in forming bottles. One suitable six-layer bottle structure is PP/adhesive/EVOH/adhesive/regrind/pp where the regrind layer comprises ground manufacturing trim of the composite structure, and thus includes all the constituents of the structure. A five-layer structure omits the regrind layer from the structure described above, and is useful in sheet and thermoformed container manufacture.

A seven-layer structure useful in sheet and thermoforming container manufacture is PP/regrind/adhesive/EVOH/adhesive/regrind/PP.

In any of the foregoing structures, polyethylene terephthalate or equivalent materials can be substituted for one or both polypropylene layers.

The invention also comprehends a method of making composite structures wherein the inventive adhesive blend is adhered to one or more solid substrates such as those identified herein. Suitable methods include, but are not limited to, coextrusion (e.g. blown or cast film coextrusion, sheet coextrusion, etc.), extrusion lamination, and coextrusion blow molding. The latter is a preferred method of forming bottles, for example.

Other useful composite structure forming methods include injection blow molding, stretch blow molding, melt thermoforming, solid phase pressure forming (SPPF), coated film, blown film, and coextrusion coating.

EXAMPLES

The invention is further described and illustrated by the following detailed examples which are not intended to be limiting.

Example 1

Pellets of a commercially available statistical ethylene-propylene copolymer (e.g. Quantum PP-7200-GF resin) comprising about 2 wt% ethylene and having an MFR of about 2 g/10 min. was used as the ungrafted polymeric composition, except for control examples using propylene homopolymers.

A Werner-Pfleiderer Model ZSK-S3 twin-screw extruder/reactor having five heated zones Z1–Z5 and associated polymer pellet feed, reactant supply and metering equipment, and melt cooling, extruding, and pelletizing equipment as shown in the figure was used.

For use in preparing the grafted propylene homopolymer products used as controls in this example, a hot melt granulator equipped with vapor collection apparatus and fine solids separation equipment (not shown) for safety and cleanliness was used in place of the underwater pelletizer shown in the figure.

The temperatures of the heated zones Z1–Z5 were designated T1–T5, respectively. The temperature of the screen changer 40 of the figure was designated T6, and that of the die plate 41 was designated T7.

The ZSK-53 extruder was warmed up to an initial T6 temperature of 240° C. to shorten the warm-up time. Thereafter, the temperatures of the seven zones (including screen changer and die plate) were set as follows:

| T1 = 165° C. | T4 = 185° C. |
|---|---|
| T2 = 175° C. | T5 = 220° C. |
| T3 = 185° C. | T6 = 200° C. |
|  | T7 = 200° C. |

The ZSK-53 extruder twin-screw feed impellers were set at a rate of 250 RPM. A flow of nitrogen gas through the extruder was established at 9.6 SCFH.

The system was started up using a propylene homopolymer (Quantum PP-8000-GK having an MFR of 5 g/10 min. and a density of 0.905 g/cc) at a feed rate of 50 lb/hr.

When the desired temperatures T1–T7 were reached, the impellers of the extruder were started and the extruder was purged of air by maintenance of the nitrogen gas flow, while driving the polypropylene homopolymer feed through the extruder for 20 minutes at the stated temperatures and at a rate of 50 lb/hr. The nitrogen gas flow was maintained through the grafting reaction process.

Maleic anhydride and peroxide catalyst feeds were then introduced. The peroxide feed rate was initially set at zero and gradually varied between 0.3 and 1.8 wt. % based upon the weight of the polypropylene feed to study the effects of catalyst concentration on product properties. The maleic anhydride feed rate was set at a constant 3 wt. % based on the polypropylene feed rate.

When steady state conditions were established, the polypropylene feed was changed to the statistical copolymer, steady state conditions were again established while maintaining nitrogen gas flow through the extruder, and samples of the resulting maleic anhydride-grafted polypropylene were taken to determine viscosity (by measuring MFR) and grafted maleic anhydride concentration.

The statistical polypropylene copolymer was fed at a rate of 50 lb/hr. The polypropylene, di-tertbutylperoxide, and maleic anhydride feed rates were maintained as stated above and then a 15-pound sample of maleic anhydride-modified polypropylene product was collected.

To further study the effect of catalyst feed rate on product properties, the peroxide catalyst feed rate was set at 1.4 wt. %, and the feeds of polypropylene, maleic anhydride and peroxide were continued, as above, as was the nitrogen gas flow, to stabilize the reaction conditions and the product output and 20-minute samples were again taken.

The peroxide catalyst feed rate was then adjusted to 0.6 wt. %, and 20-minute samples were taken.

To further test the effect of peroxide feed rate on product properties, the peroxide feed rate was changed to 0.3 wt. % and the feeds of polypropylene, maleic anhydride and peroxide catalyst were continued, as was the nitrogen gas flow, to obtain steady state 20-minute samples of modified polypropylene, as above. Then, the extruder was purged with nitrogen gas flow while feeding pure propylene homopolymer while the peroxide and maleic anhydride feeds were turned off to effect shutdown of the process.

Analyses of the product samples of the maleic anhydride-modified statistical polypropylene polymer are summarized below in Table 1.

Example 2

The ZSK-53 extruder of Example 1 and the figure was used to graft maleic anhydride to a prolypylene-/ethylene impact copolymer (Quantum PP-1510 resin) having a target ethylene content of about 11.5 to about 12.7 wt. %, preferably about 12.2 wt. % and having an initial (ungrafted) target MFR of about 0.4 to about 1.3 g/10 min.

The reactor was warmed up and purged with nitrogen gas flow, a polypropylene homopolymer (Quantum PP-8000-GK resin) was driven through the reactor and maleic anhydride and peroxide feed rates were set, as in Example 1, and the polypropylene impact copolymer feed was introduced at a rate of 50 lb/hr.

Samples were taken before and after adjusting the peroxide feed rate to obtain different samples as in Example 1. The polypropylene feed was changed to propylene homopolymer with nitrogen gas flow while the maleic anhydride and peroxide catalyst feeds were shut off, and the process was shut down as above. Analyses of the samples taken from Examples 1 and 2 are set forth below in Table 1.

TABLE 1

| CHARACTERISTICS OF GRAFTED POLYPROPYLENE COMPOSITIONS | | | | | | |
|---|---|---|---|---|---|---|
| SAMPLE | FEED | Wt. % DTBP | PRODUCT MMI* | PRODUCT MFR** | PRODUCT MAH (wt. %) | GRAFTED*** MAH (wt. %) |
| Example 1 | | | | | | |
| A (Control) | Homopolymer | 1.0 | 14.75 | 1977 | 1.755 | 1.15 |
| B | Statistical | 1.0 | 4.14 | 555 | 1.80 | 1.14 |
| C | Statistical | 1.40 | 5.06 | 678 | 2.37 | 1.26 |
| D | Statistical | 1.76 | 7.33 | 982 | 2.60 | 1.26 |
| E | Statistical | 0.64 | 1.2 | 161 | 1.52 | 1.31 |
| F | Statistical | 0.32 | 0.34 | 46 | 1.15 | 0.66 |
| G (Control) | Homopolymer | 1.0 | 12.0 | 1608 | 1.75 | 1.03 |
| Example 2 | | | | | | |
| H (Control) | Homopolymer | 1.0 | 13.34 | 1788 | 1.81 | 1.21 |
| I | Impact | 1.0 | 2.72 | 364 | 2.02 | 1.81 |
| J | Impact | 1.4 | 2.97 | 398 | 2.28 | 2.00 |
| K | Impact | 1.8 | 3.18 | 426 | 2.30 | 1.74 |
| L | Impact | 0.6 | 1.33 | 178 | 2.35 | 1.59 |
| M | Impact | 0.3 | 0.21 | 28 | 1.81 | 1.37 |

*MMI = Modified melt index measured at 190° C., and a 0.03 inch capillary.
**MFR (ASTM D1238, Condition L) Calculated = 134 MMI + 0.4267
***MAH content was measured after laboratory extractin using MEK (methyl ethyl ketone) as an extraction liquid. Polymer samples were dissolved in MEK at 50° C. and precipitated in water. The MAH content of dry polymer was then measured using FTIR techniques.

The results of Example 1 show that if homopolymer polypropylene is used as an ungrafted feed to be grafted under certain process conditions, the resulting calculated MFR would be in the range of about 1600 to about 2000 g/10 min. By using a statistical ethylene-propylene copolymer as the ungrafted feed material at identical process conditions, the resulting calculated MFR was reduced to 555 g/10 min.

It is also demonstrated in Example 1 that when the peroxide feed rates were varied around a target of 1.0 wt. % (e.g. in the range of 0.6 to 1.4 wt. %), the resulting calculated MFRs ranged from 161 to 678, respectively.

Example 1-D used a peroxide feed rate of 1.76 wt. %. This demonstrated the effect of overfeeding of the peroxide on % MAH and MFR.

Example 2 shows that if homopolymer polypropylene is used as the feed to be grafted under certain process conditions, the resulting calculated MFRs ranged from about 1600 to about 2000 g/10 min. By using a polypropylene impact copolymer as the ungrafted feed material at identical process conditions, the resulting calculated MFR was reduced to 364 g/10 min.

Example 2 also demonstrates that when the peroxide feeds were varied around a target of 1.0 wt. % (e.g. 0.6 to 1.4 wt. %), the resulting calculated MFRs ranged from 178 to 398, respectively.

Example 2-D used a peroxide feed rate of 1.8 wt. %. This demonstrated the effect of overfeeding the peroxide on % MAH and MFR.

Example 3

Samples of certain maleic anhydride-grafted statistical polypropylenes of Example 1 and certain maleic anhydride-grafted impact polypropylenes of Example 2, and the control homopolymer grafted products A and H of Examples 1 and 2, respectively were blended in the following proportions with (a) a commercially available ethylene/propylene elastomer copolymer (Exxon Vistalon ® MDV-746), and (b) an unmodified propylene-ethylene statistical copolymer (Quantum PP-7200-AF) to form adhesive compositions:

| | |
|---|---|
| 10 wt. % | MAH-grafted polypropylene |
| 30 wt. % | Ethylene/propylene Elastomer (Exxon Vistalon ® MDV-746) |
| 60 wt. % | Statistical propylene-ethylene copolymer (Quantum PP7200AF) |

40 g samples of the adhesive blends were mixed in a laboratory Brabender mixer at 370° F. at 100 RPM for ten (10) minutes, and then applied by a standard heat seal method (i.e., ASTM F-88) to ethylene/vinyl alcohol (EVAL® F-101) and polypropylene (Quantum PP-7200-AF) films to determine adhesion (lb/in). Heat sealing was done at both 375° F. for 3.0 seconds and 40 pounds per square inch (psig), and at 425° F. for 3.0 seconds and 40 psig. Adhesion properties are set forth in Table 2, below:

TABLE 2

| Sample No. | Adhesion lb/in |
|---|---|
| HEAT SEAL AT 375° F., 3.0 SEC., 40 PSIG | |
| A | 0.3 |
| B | 3.6 |
| C | 1.4 |
| D | 1.7 |
| H | 1.2 |
| I | 0.2 |
| J | 0.2 |
| K | 0.5 |
| HEAT SEAL AT 425° F., 3.0 SEC., 40 PSIG | |
| A | 5.6 |
| B | 3.3 |
| C | 4.9 |
| D | 6.1 |
| H | 6.6 |
| I | 2.8 |
| J | 5.3 |
| K | 9.3 |

Example 4

Fifteen adhesive blends were prepared using grafted polymeric products comprising a propylene homopolymer, statistical copolymer, or impact copolymer grafted with maleic anhydride, as detailed below. The blends are designated in Table 5, below, as Blends A-O. (Blends I-K are comparative examples, and Blend K contained no grafted product.)

In each case, except for Example K, a grafted product was blended with a polypropylene blending resin comprising a statistical or modified impact polypropylene copolymer or a propylene homopolymer and in all cases other than Blends N and O with an additional component comprising ethylene propylene rubber (EPR), high molecular weight low density polyethylene (HMW LDPE), or linear low density polyethylene (LLDPE), as indicated in Table 5. The adhesive blends were incorporated in five-layer composite structures, as detailed below, and tested for interlayer adhesion. The adhesion results are given in Table 5.

The impact copolymer used as the graft copolymer backbone was Quantum PP-1510 HC resin comprising 12 to 15 wt. % ethylene and having an MFR in the range of 0.8 to 1.2 g/10 min. The statistical copolymer used as the polymer to be grafted, blending resin, or composite structure substrate was Quantum PP-7200-GF polypropylene comprising 2 wt. % ethylene and having an MFR of 2 g/10 min. The modified impact copolymer used as a blending resin was was made by blending a mixture of about 90 wt. % impact copolymer and 10 wt. % HDPE to an MFR of about 2 g/10 min. and a density of about 0.90 g/cc. The ethylene content of the modified impact copolymer was about 22 wt. %.

The propylene homopolymer used as a polymer to be grafted, blending resin or composite structure substrate was Quantum PP-8000-GK having a density of 0.905 g/cc and an MFR of 5 g/10 min.

The ethylene-propylene rubber (EPR) used as a blending resin was Vistalon® 746 elastomer from Exxon, comprising about 70 wt. % ethylene and having a Mooney viscosity ($ML_{1+4}$ (125° C.)) of 19. The high molecular weight low density polyethylene used as a blending resin was Quantum PE3509 polyethylene having a density of 0.924 g/cc and a melt index of 0.3 g/10 min. The LLDPE blending resin was an ethylene-1-butene copolymer having a density of 0.918 g/cc and an MI of 2.0 g/10 min. EVAL® E-1:51 (41 mole % ethylene) and F-101 (32 mole % ethylene) ethylene-vinyl alcohol substrates having MI values in the range of 1.0 to 5.5 g/10 min. were used as middle layers in the composite structures.

In each of Samples A through K, the adhesive blend was processed into a five-layer composite structure on a Welex coextrusion line using the following materials and conditions:

TABLE 3

| Processing Conditions on Welex Coextrusion Line | | |
|---|---|---|
| Materials | Thickness (mils) | Melt Temp. |
| Layer 1  PP8000GK | 18.0 | 435° F. |
| Layer 2  Adhesive | 2.3 | 435° F. |
| Layer 3  EVAL ® E-151 | 4.5 | 425° F. |
| Layer 4  Adhesive | 2.3 | 435° F. |
| Layer 5  PP8000GK | 18.0 | 435° F. |

With Samples L, M, N, and O, the composite structures were processed on a Killion coextrusion line using the following materials and conditions:

TABLE 4

| Processing Conditions on Killion Coextrusion Line | | |
|---|---|---|
| Materials | Thickness (mils) | Melt Temp. |
| Layer 1  PP7200GK | 10.0 | 435° F. |
| Layer 2  Adhesive | 2.5 | 435° F. |
| Layer 3  EVAL ® F-101 | 3.0 | 425° F. |
| Layer 4  Adhesive | 2.5 | 435° F. |
| Layer 5  PP7200GK | 10.0 | 435° F. |

The adhesive blend constituents in proportions and adhesion results are given in Table 5, below.

TABLE 5

| Blend | A | B | C | D | E | F | G | H | I[2] | J[2] |
|---|---|---|---|---|---|---|---|---|---|---|
| Graft Copolymer Wt. % | 10 | 10 | 10 | 10 | 10 | 10 | 10 | 10 | 10 | 10 |
| Grafted Polymer[1] | Impact | Impact | Statistical | Statistical | Statistical | Statistical | Impact | Impact | Homo. | Homo. |
| Wt. % MAH | 2.7 | 2.7 | 1.7 | 1.7 | 1.8 | 2.4 | 2.4 | 2.7 | 2.0 | 2.0 |
| Blending Resin PP Type[1] | Statistical | Homo. | Statistical | Homo. | Statistical | Statistical | Statistical | Statistical | Homo. | Mod. Impact |
| Blending Resin - wt. % | 60 | 60 | 60 | 60 | 60 | 60 | 60 | 60 | 60 | 65 |
| EPR - wt. % | 30 | 30 | 30 | 30 | 30 | 30 | 30 | 30 | 30 | — |
| HMW - LDPE wt. % | — | — | — | — | — | — | — | — | — | 25 |
| LLDPE wt. % | — | — | — | — | — | — | — | — | — | — |

TABLE 5-continued

| Adhesion (lb/in) | 23.6 | 5.3 | 24.7 | 7.3 | 17.3 | 24.0 | 19.8 | 24.5 | 8.7 | 6.6 |
|---|---|---|---|---|---|---|---|---|---|---|

| Blend | K[2] | L[3] | M[3] | N[3] | O[3] |
|---|---|---|---|---|---|
| Graft Copolymer Wt. % | — | 8 | 8 | 10 | 6 |
| Grafted Polymer[1] | — | Impact | Impact | Impact | Impact |
| Wt. % MAH | — | 2.4 | 2.0 | 2.0 | 2.4 |
| Blending Resin PP Type[1] | Mod. Impact | Mod. Impact | Mod. Impact | Mod. Impact | Mod. Impact |
| Blending Resin - wt. % | 70 | 74 | 74 | 90 | 94 |
| EPR - wt. % | 30 | — | — | — | — |
| HMW - LDPE wt. % | — | 18 | — | — | — |
| LLDPE wt. % | — | — | 18 | — | — |
| Adhesion (lb/in) | 0.0 | 9.7 | 11.6 | 13.7 | 18.6 |

[1]Key to propylene polymer types
Impact copolymer comprised 12–15 wt. % ethylene; MFR = 0.8–1.2 g/10 min.
Statistical copolymer comprised 2 wt. % ethylene; MFR = 2 g/10 min.
Propylene homopolymer - density 0.905 g/cc; MFR = 5 g/10 min.
Modified Impact Copolymer - density 0.90 g/cc; MFR = 2 g/10 min.
[2]Comparative example.
[3]Killion extrusion line.

Table 5 illustrates a variety of propylene polymers useful as polymeric compositions to be grafted in adhesive blends made according to the invention, as well as the use of a propylene homopolymer in comparative grafted products and adhesive blends made therefrom.

Samples A through H demonstrated the effectiveness and sensitivities of different lots of grafted polypropylene. The types of grafted polymer, the levels of grafted comohomer, and the blending polypropylene types were varied in these samples. The excellent performance of these grafted products was evidenced by the level of adhesion achieved with EVOH in coextrusion.

Comparative Samples I and J were blended with grafted products based on homopolymer polypropylene produced by the same melt grafting process as in the inventive examples. After blending with a third component (EPR or HMW LDPE), the levels of adhesion achieved during coextrusion were between 6.6 and 8.7 lb/in.

Comparative Sample K was blended without a grafted polymeric product component. It was apparent that no adhesion was achieved between the blend and the EVOH layer.

Samples L, M, N, and O were further illustrations of the various blending options for formulating the inventive adhesive blend. For typical container applications, adhesion levels of 5 to 10 lb/in. are marginally acceptable. Adhesion levels of 10 to 20 lb/in. are satisfactory, whereas adhesion levels exceeding 20 lb/in. are highly satisfactory.

Example 5

Two adhesive blends were made (Samples P and Q) and their adhesion values were measured using a T-peel test according to ASTM D1876 on a coextruded five-layer composite structure made in sheet form with a statistical ethylene-propylene copolymer (Quantum PP-7200-GF), adhesive and EVOH (EVAL® F-101 (PP/adhesive/EVOH/adhesive/PP). All formulations were compounded using a sincle screw extruder.

Each formulation contained about 90 wt. % base resin as identified in Table 6 and about 10 wt. % grafted product having about 2.0 to about 2.5 wt. % maleic anhydride grafted onto a propylene/ethylene impact copolymer (approximately 12 wt. % ethylene; ungrafted MFR of 0.7 g/10 min). The base resin compositions of the seven samples and the adhesion to polypropylene and EVOH are shown in Table 6 below.

Sample P was an adhesive according to the invention having a modified impact base resin that was made by blending a mixture of approximately 90 wt. % impact copolymer and 10 wt. % HDPE to an MFR of about 2 g/10 min. The ethylene content of the modified impact copolymer was about 22 wt. %.

Sample Q was a blend having an impact copolymer base resin (Quantum pp 1510) which contained 12 wt. % ethylene and had a melt flow rate of 0.7 g/10 min.

TABLE 6

ADHESION VALUES FOR COMPOSITIONS WITH 90 WT. % PP BASE RESINS AND 10 WT. % GRAFTED PRODUCT

| Sample | Type of Base Resin | MFR[1] | Ethylene Content (Wt. %) | Adhesion (lb/in.) |
|---|---|---|---|---|
| P | Modified Impact | 2.0 | 20 | 19.0 |
| Q | Impact | 0.7 | 12 | 14.0 |

[1]Melt flow rate in g/10 min at 230° C., 2160 grams.

A comparison of the adhesion values obtained in Samples P and Q demonstrates the excellent adhesion was obtained when the base resin was a modified impact copolymer or an impact copolymer.

Example 6

Four adhesive blends were made (Samples R-U) and their adhesion values were measured using a T-peel test on a five-layer coextruded sheet made with propylene-ethylene statistical copolymer (Quantum pp-7200-GF), adhesive, and EVOH (EVAL® F-101). All formulations were compounded using a single screw extruder, and the composite structures were processed on a Killion coextrusion line using the following materials and conditions:

TABLE 7

| Processing Conditions on Killion Coextrusion Line | | |
|---|---|---|
| Materials | Thickness (mils) | Melt Temp. |
| Layer 1   PP7200GK | 10 | 440° F. |
| Layer 2   Adhesive | 2.5 | 435° F. |
| Layer 3   EVAL ® F-101 | 3 | 425° F. |
| Layer 4   Adhesive | 2.5 | 435° F. |
| Layer 5   PP7200GK | 10 | 440° F. |

All formulations contained about 65 wt. % modified impact base resin and about 10 wt. % grafted product, each as described in Example 5. Each resin also included about 25 wt. % of a third component. A comparison of the adhesive strengths of the adhesive blends of Samples R-U is shown in Table 8.

The third components included in the adhesive blends of Samples R-U were an ethylene homopolymer (HMW LDPE, Quantum NA 358-002, 0.3 MI, density 0.924 g/cc), LLDPE (Quantum GA 502-010, 2 MI, density 0.918 g/cc) an ethylene-n-butylacrylate copolymer (Quantum EA 719-009, wt. % n-butyl acrylate, 0.3 MI, density 0.922 g/cc) and an ethylene/propylene elastomer (Exxon Vistalon ® MDV-746).

TABLE 8

| | ADHESION VALUES COMPARING THIRD COMPONENTS | | |
|---|---|---|---|
| Sample | Third Component Polymer Type | Third Component Polymer Melt Index[1] | Adhesion (lb/in.) |
| R | HMW LDPE | 0.3 | 15.8 |
| S | LLDPE | 2.0 | 13.3 |
| T | EnBA | 0.3 | 14.4 |
| U | EPR | Not Applicable | 12.0 |

[1] g/10 min. at 190° C.

The foregoing detailed description is given for clearness of understanding only, and no unnecessary limitations are to be understood therefrom, as modifications within the scope of the invention will be apparent to those skilled in the art.

We claim:

1. A grafted polymeric product comprising a polymeric composition containing a thermoplastic impact ethylene-propylene copolymer comprising a reactor-made intimate mixture of propylene homopolymers and statistical copolymers of propylene and ethylene comprising about 5 to about 30 wt. % ethylene, said polymeric composition comprising greater than 50 wt. % propylene units, and at least about 1 wt. %, based on total grafted polymeric composition, of a grafting monomer comprising one or both of maleic anhydride and maleic acid grafted thereto, said grafted polymeric product having an MFR of about 700 g/10 min. or less and greater than that of said polymeric composition prior to grafting as measured according to ASTM D-1238, Condition L.

2. The grafted polymeric product of claim 1 wherein said polymeric composition has an MFR of about 12 g/10 min. or less measured according to ASTMD-1238, Condition L before grafting.

3. The grafted polymeric product of claim 2 wherein said MFR of said polymeric composition is in the range of about 0.01 to about 12 g/10 min. before grafting.

4. The grafted polymeric product of claim 2 wherein said grafted monomer comprises about 1 wt. % to about 6 wt. % of said grafted polymeric product.

5. The grafted polymeric product of claim 2 wherein said polymeric composition comprises an impact ethylene-propylene copolymer comprising about 6 to about 16 wt. % ethylene and the MFR of said grafted polymeric product does not exceed about 600 times said MFR of said ungrafted polymeric composition.

6. The grafted polymeric product of claim 1 wherein said impact copolymer comprises about 11 to about 15 wt. % ethylene, and has an ungrafted MFR in the range of about 0.4 to about 1.5 g/10 min. measured according to ASTM D-1238, Condition L.

7. The grafted polymeric product of claim 6 comprising said grafting monomer grafted in said grafted polymeric product at a concentration such that the MFR of said grafted polymeric product is in the range of about 200 to about 450 g/10 min. measured according to ASTMD-1238, Condition L.

8. The grafted polymeric product of claim 7 wherein said grafted monomer concentration is about 2 wt. % to about 2.5 wt. %.

9. An adhesive blend, comprising
(a) about 0.1 wt. % to about 25 wt. % of a grafted polymeric product comprising a polymeric composition containing a thermoplastic impact ethylene-propylene copolymer comprising a reactor-made intimate mixture of propylene homopolymers and statistical copolymers of propylene and ethylene comprising about 5 to about 30 wt. % ethylene, said polymeric composition comprising greater than 50 wt. % propylene units, and at least about 1 wt. %, based on total grafted polymeric composition, of a grafting monomer comprising one or both of maleic anhydride and maleic acid grafted thereto, said grafted polymeric product having an MFR of about 700 g/100 min. or less and greater than that of said polymeric composition prior to grafting as measured according to ASTMD-1238, Condition L; and,
(b) up to about 99.9 wt. % of an ungrafted polyolefin blending resin.

10. The adhesive blend of claim 9 wherein said blending resin comprises an elastomeric polyolefin in an amount of up to about 40 wt. % of said blend.

11. The adhesive blend of claim 10 wherein said elastomeric polyolefin is ethylene-propylene rubber.

12. The adhesive blend of claim 9 wherein said polyolefin blending resin is a propylene polymer.

13. The adhesive blend of claim 12 wherein said propylene polymer is selected from propylene homopolymers and copolymers of propylene and up to about 10 wt. % of ethylene or a $C_4$-$C_6$ 1-olefin monomer.

14. The adhesive blend of claim 12 wherein said blending resin comprises an impact propylene-ethylene copolymer.

15. The adhesive blend of claim 14 wherein said impact propylene-ethylene copolymer of said blending resin comprises a reactor-made intimate mixture of a propylene homopolymer and statistical copolymers of propylene and ethylene.

16. The adhesive blend of claim 15 wherein said impact ethylene-propylene copolymer of said blending resin comprises about 5 to about 30 wt. %. ethylene.

17. The adhesive blend of claim 16 wherein said impact ethylene-propylene copolymer of said blending resin comprises about 6 wt. % to about 16 wt. % ethylene and has an MFR in the range of about 0.8 to about 1.5 g/10 min. measured according to ASTM D-1238, Condition L.

18. The adhesive blend of claim 16 wherein said impact ethylene-propylene copolymer of said blending resin is a thermoplastic olefinic elastomer comprising greater than about 12 wt. % ethylene.

19. The adhesive blend of claim 12 wherein said blending resin comprises a modified impact copolymer comprising a blend of (A) an impact copolymer selected from the group consisting of (a) reactor-made intimate mixtures of polypropylene and statistically oriented copolymers of propylene and ethylene, and (b) blends of polypropylene and statistically oriented copolymers of propylene and ethylene and (B) an ethylene polymer.

20. The adhesive blend of claim 19 wherein said ethylene polymer is selected from the group consisting of ethylene homopolymers, low density polyethylene, ethylene-acid copolymers, ethylene-vinyl acetate copolymers, ethylene-acrylate copolymers, high density polyethylene, linear low density polyethylene, very, low density polyethylene, ultra low density polyethylene, and blends thereof.

21. The adhesive blend of claim 19 wherein said modified impact copolymer has an MFR of between about 1 and about 200 g/10 min. measured according to ASTM D-1238, Condition L.

22. The adhesive blend of claim 21 wherein said modified impact copolymer of said blending resin comprises about 15 to about 30 wt. % total ethylene.

23. The adhesive blend of claim 21 wherein said modified impact copolymer comprises a visbroken blend of said ethylene polymer and a reactor-made intimate mixture of propylene homopolymers and statistical copolymers of propylene and ethylene.

24. The adhesive blend of claim 23 wherein said ethylene polymer is HDPE and said modified impact copolymer comprises about 5 to about 15 wt. % HDPE and an ethylene content of about 16 to about 26 wt. %.

25. The adhesive blend of claim 9 wherein said blending resin comprises an ethylene polymer selected from ethylene homopolymers and copolymers of ethylene and a $C_{3-C8}$ 1-olefin comohomer.

26. The adhesive blend of claim 25 wherein said ethylene polymer is HMW LDPE.

27. The adhesive blend of claim 26 wherein said HMW LDPE is an ethylene homopolymer having a specific gravity in the range of about 0.915 to about 0.930, inclusive, a melt index of less than about 1 dg/min. as measured at 190° C., and a narrow molecular weight distribution as measured by a ratio of weight average molecular weight. ($M_w$) to number average molecular weight ($M_n$) of about 3 to about 5, inclusive.

28. The adhesive blend of claim 25 wherein said ethylene polymer is LLDPE.

29. The adhesive blend of claim 25 comprising about 6 to about 16 wt. % of said grafted polymeric product, 0 to about 30 wt. % of said ethylene homopolymer or ethylene/1-olefin copolymer, and the balance a propylene polymer blending resin selected from the group consisting of propylene homopolymers, statistical propylene-ethylene copolymers, impact propylene-ethylene copolymers, and modified impact propylene-ethylene copolymers.

30. The adhesive blend of claim 9 wherein said ungrafted polymeric composition has an MFR of about 12 g/10 min. or less measured according to ASTM D-1238, Condition L.

31. The adhesive blend of claim 30 wherein said MFR of said ungrafted polymeric composition is in the range of about 0.01 to about 12 g/10 min.

32. The adhesive blend of claim 30 wherein said grafted monomer comprises about 1 wt. % to about 6 wt. % of said grafted polymeric product.

33. The adhesive blend of claim 30 wherein said ungrafted polymeric composition comprises an impact ethylene-propylene copolyrner comprising about 6 to about 16 wt. % ethylene and the MFR of said grafted polymeric product does not exceed about 600 times said MFR of said ungrafted polymeric composition.

34. The adhesive blend of claim 9 wherein said impact copolymer comprises about 11 to about 15 wt. % ethylene and has an ungrafted MFR in the range of about 0.4 to about 1.5 g/10 min. measured according to ASTMD-1238, Condition L.

35. The adhesive blend of claim 34 comprising said grafting monomer grafted in said grafted polymeric product at a concentration such that the MFR of said grafted polymeric product is in the range of about 200 to about 450 g/10 min. measured according to ASTMD-1238, Condition L.

36. The adhesive blend of claim 35 wherein said grafted monomer concentration is about 2 wt. % to about 2.5 wt. %.

* * * * *